United States Patent
Prochazka

[11] 3,803,409
[45] Apr. 9, 1974

[54] COAXIAL DIODE MOUNT FOR USE WITH FIBER OPTIC LIGHT GUIDE

[75] Inventor: Rudolf J. Prochazka, Springfield, Va.

[73] Assignee: The United States of America as represented by the Secretary of the Army, Washington, D.C.

[22] Filed: July 14, 1972

[21] Appl. No.: 271,957

[52] U.S. Cl.............. 250/227, 250/239, 350/96
[51] Int. Cl. ............................. G02b 5/16
[58] Field of Search...... 250/227, 239, 218, 217 SS; 350/96 B

[56] References Cited
UNITED STATES PATENTS

| | | | |
|---|---|---|---|
| 3,582,637 | 6/1971 | Cecil, Jr.................... | 350/96 X |
| 3,628,036 | 12/1971 | Humphrey .................. | 250/227 |
| 3,432,676 | 3/1969 | Lindberg..................... | 250/239 |
| 3,502,887 | 3/1970 | Erickson et al............. | 250/218 |
| 3,423,594 | 1/1969 | Galopin ...................... | 250/227 X |
| 3,353,026 | 11/1967 | Israely........................ | 250/227 |

*Primary Examiner*—Walter Stolwein
*Attorney, Agent, or Firm*—Edward J. Kelly; Herbert Berl; Saul Elbaum

[57] ABSTRACT

A conventional single lead connector is modified to house a light emitting or light detecting device. A first end of the connector is adapted to connect with a current or voltage driving source while the opposite end of the connector receives a fiber optic light guide. In the instance where the connector houses a light emitting device such as a diode, an electrical signal is applied to the diode through conductors in the connector. Resulting light from the diode is transmitted along the fiber optic to a remote detector. If a light detecting device is housed by the conductor, a reversal of light-electrical signal transmission occurs.

8 Claims, 7 Drawing Figures

COAXIAL DIODE MOUNT FOR USE WITH FIBER OPTIC LIGHT GUIDE

The invention described herein may be manufactured, used and licensed by or for the United States Government for governmental purposes without the payment to me of any royalty thereon.

FIELD OF THE INVENTION

The present invention relates to a connector mount, and more particularly to a mount which houses a light emitting or light detecting device. A fiber optic light guide is attached to the mount so that signal translation can take place between the electrically conducting connector portion of the mount and the attached fiber optic light guide.

THE PRIOR ART

Compact light emitting devices are used in conjunction with fiber optic light guides to form telemetry data links which have intrinsic electrical isolation between the transmitter and the receiver. Typical applications involve high frequency circuitry which is terminated at the inputs and outputs by connectors to preserve circuit impedance, performance, and shielding. Electromagnetic field measurements, for example, require that field sensors be placed in the environment to be measured. The use of fiber optic light guides to interconnect field sensors and measuring instrumentation permits the measurement to be made with minimum disturbance to the environment and eliminates the common mode coupling between sensors and recording instruments, normally introduced by "hard wire" connections.

Light emitting and light detecting devices, used in a fiber optic system for high frequency applications, will reduce circuit performance if they are not properly coupled to their respective active circuits. Introduction of measuring devices, (e.g., current and voltage probes), can degrade the devices characteristics. The current and prior art has established a need for a fixture to accommodate electro-optic devices and fiber optic light guides and still maintain circuit parameters and shielding.

SUMMARY OF THE INVENTION

In order to mount electro-optic devices and fiber optics, relatively large mounts are employed which require expensive machining and incur inconvenience to the user. Because of the relatively large size of currently available mounts, high frequency isolation is difficult to maintain. In marked contrast, the present invention is directed toward a compact coaxial diode mount which provides a holder for fiber optics and small electro-optic devices that is of superior design. By using connector technology, the present mount provides a convenient way to connect light emitters and light detectors to their respective generators and receivers. Also, high frequency pulse application is enhanced by circumventing large signal degradations. It further provides a convenient means for a mechanical coupling between the electro-optic devices and fiber optic light guides, achieving and maintaining accurate alignment in a manner difficult to obtain with prior art devices. The present design features subcomponent and modular construction allowing diode replacement. Preassembled units can be used making it ideal for field applications in telemetry and instrumentation. In summary, the present mount permits a light emitting diode or light detecting diode to be conveniently and properly coupled to circuitry for high frequency applications.

The present invention offers a number of distinct advantages which include:

The electro-optic device mount and fiber optic light guide coupler are made from standard electrical connectors routinely stocked by electronics suppliers and users, so that the materials required to make them are readily available.

Only minimal modification to the standard connectors is required to convert them into device mounts or light guide couplers, so that the cost advantage from the standard components is realized in the application of this invention.

No special tooling is required for conversion.

The use of an electrical connector permits easy attachment of the devices to circuitry used for light emitting devices and for light detecting devices, since the use of electrical connectors as input/output terminations is common.

Flexibility in instrumentation is provided inherently in the design of the mount, since there are many adapters from the type of connectors used in the invention to all other types of connectors in common use.

The connector diode mount provides a convenient way to introduce a fiber optic link into a connector coupled instrumentation system without going into internal circuitry.

The flexibility afforded by the acceptance of different diode package sizes permits diodes having a range of power ratings to be used in the same standardized diode mount.

The connector diode mount provides a means of coupling the light emitters and detectors to circuitry without introducing long leads.

This diode mount allows for shielded diagnostic measurements without disturbing the electrical or physical integrity of the mounted device.

The mount minimizes reflections in pulse applications.

Each sub-assembly of the diode mount has the feature that in the event the electro-optic device fails, the diode mount can be reused.

The modular nature of the diode mount permits preassembly of a number of mounted diodes for convenience in field test work. If a diode burns out, it can be quickly replaced by coupling in another module in its place.

Alignment between the electro-optic devices and the light guide is maintained.

Mechanical coupling of the fiber optic light guide to the electro-optic device is provided.

Attaching and detaching the light guide is quickly and easily done.

Mechanical protection to the end of the light guide is provided.

The above-mentioned objects and advantages of the present invention will be more clearly understood when considered in conjunction with the accompanying drawings, in which:

DETAILED DESCRIPTION OF THE INVENTION

Figure 2:
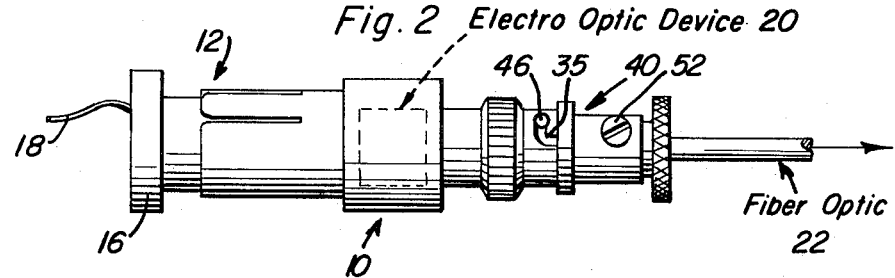
FIG. 2 is an elevational view illustrating the components of FIG. 1 connected. The figure illustrates the connection of the diode mount to an electrical terminal at one end, while a fiber optic is illustrated as being disposed in the light guide holder.

Referring to FIG. 2, the first embodiment of the present invention is illustrated as the connector generally indicated by reference numeral 10. The illustrated connector includes a coaxial diode mount 12 that has a plug end adapted to connect with a terminal jack 16 having electrical lead 18 connected thereto. An electro-optic device such as a diode is characterized by reference numeral 20 and is indicated as being positioned in the interior of the diode mount 12.

At the end opposite the plug end is a light guide holder in which fiber optic 22 is attached for extension outwardly thereof to a remotely situated system, not forming a part of the present invention.

The electro-optic device may be a light emitting diode which produces light when energized by electrical signals presenting themselves at input terminal 16. The resultant light is transmitted through the fiber optic 22 through a remotely situated detector. In a similar capacity, the transmission can be reversed so that light is transmitted through the fiber optic 22 to a detector which now forms the electro-optic device 20. In such an arrangement, the detector generates electrical signals at terminal 16, which forms an output terminal. It should be emphasized that either light emitting diode or detector can be used, with the only restraint being that the device be in a coaxial package. This will become more apparent with the succeeding discussion.

It is emphasized that the basic mounts of the present invention take the form of conventional connectors that have been particularly modified to receive an electro-optic device and attached fiber optic. The resultant assembly is a novel mount for an electro-optic device such as a coaxial diode.

Figure 1:
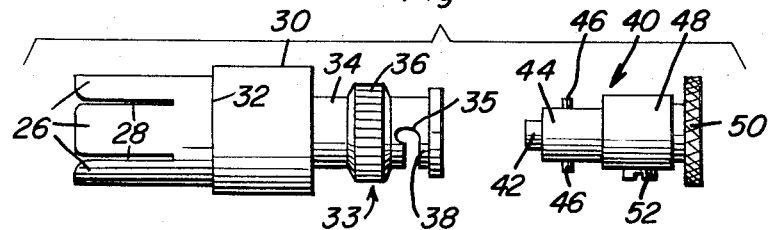
FIG. 1 illustrates an assembly view of a first embodiment of the invention. The assembly view depicts a larger coaxial diode mount and a mating light guide holder.

Referring to FIG. 1, the plug end of the coaxial diode mount illustrated consists of arcuately spaced prongs 26 that are separated by narrow slits 28. A cylindrical section of the mount is indicated by 30 and is seen to screw on to the plug end along mating threads 32.

An outward section 33 is seen to include a stepped cylindrical section 34 that extends axially outwardly from the enlarged cylindrical section 30. The cylindrical section 34 includes a raised knurled ring 36 to facilitate handling of the mount. A spiral slot 35 is formed in an outer portion 38 of the section 33, the spiral slot adapted to accommodate a bayonet mount on the light guide holder 40.

Considering the holder 40, an abutment 42 is farthest inserted into the coaxial diode mount. The abutment serves in certain applications to clamp an internally positioned electro-optic device in its place. The cylindrical section 44 includes bayonet projections 46 which are received in the spiral slot 35. An enlarged cylindrical section 48 is positioned coaxially with the cylindrical section 44. The enlarged cylindrical section 48 has an annular collar 50 located at an end opposite the abutment 42. A set screw 52 is radially positioned in the cylindrical section 48 and serves to clamp fiber optic 22 (FIG. 2) in place.

Figure 4:
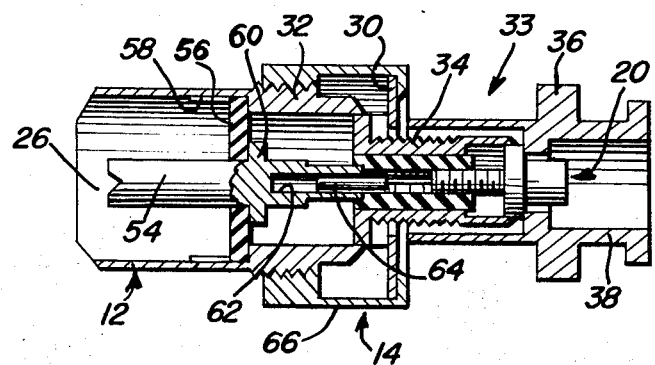
FIG. 4 is a cross sectional view of the main diode mount component shown in FIG. 1.

FIG. 4 illustrates the internal components of the coaxial diode mount shown in FIG. 1. Around the interior inward surface of the prongs 26 are rib-like abutments 58 that abut a disc-shaped insulating wafer 56 that is transversely situated with respect to the axis of coaxial diode mount 12.

A sleeve-shaped conductor 54 engages a mating axial prong in terminal 16 (FIG. 2). The prongs 26 engage the body of terminal jack 16 (FIG. 2) thereby completing a current path through the terminal 16.

Current is conducted from the sleeve-shaped conductor 54 to a receptacle 60 which is integrally connected with the sleeve conductor 54 at the opposite side of wafer 56. The receptacle 60 includes a recess 62 therein for receiving a probe 64 that conducts current to the electro-optic device 20. This device may be a light emitting diode or a solid state detector. Both devices are packaged in the coaxial mount illustrated.

Figure 5:
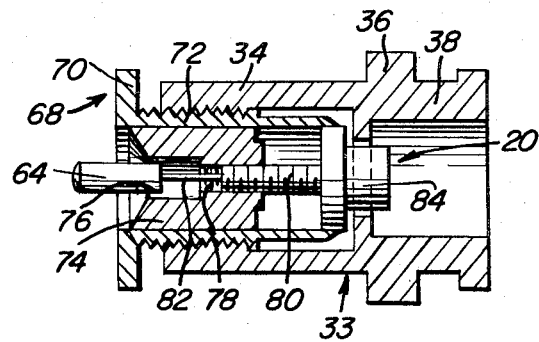
FIG. 5 is a sectional enlarged view of a subassembly included in the diode mount as shown in FIG. 4.

A sleeve-shaped member 66 circumferentially surrounds the receptacle 60 and conducts current from the prongs 26 to a T-shaped conductor generally indicated by reference numeral 68 in FIG. 5. With reference to the latter figure, the T-shaped conductor includes an annular ring 70 appending to a threaded axial section 72 that is inwardly hollowed to receive a metallic bushing 74. Current passing through the T-shaped conductor from the prongs 26 are further transmitted to the cylindrical sleeve 66 which embraces the housing terminal of electro-optic device 20. The probe 64 extends from a recess 76 in the bushing 74. Current is transmitted between probe 64 and a connecting thin lead 82. The bushing 74 has an axial threaded bore to receive the mating stud 80. It should be borne in mind that the coaxially mounted electro-optic device 20 is internally insulated so that the housing portion 84 of the device and the thin lead 82 represent terminals to the device itself.

Figure 3:
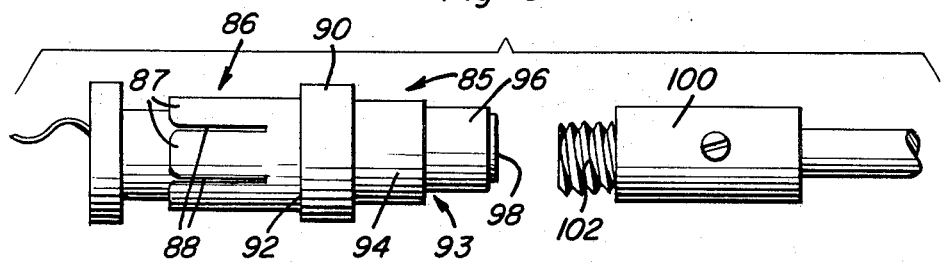
FIG. 3 is an assembly view illustrating a second embodiment of the present invention. The larger coaxial diode mount is shown in line with a screw on diode clamp and light guide bushing.

FIG. 3 illustrates a second embodiment of the invention. A second coaxial diode mount is generally indicated by reference numeral 85 and generally resembles the coaxial diode mount of FIG. 1.

The plug portion of the mount is generally indicated by 86 and is seen to include the prongs 87 separated by slits 88 in a manner identical with prongs 26 and slits 28 shown in FIG. 1. The plug portion 86 is attached to a central cylindrical section 90 along the illustrated threads 92. An end section 93 is axially disposed in oppositely directed relationship with the plug end 86. The end section 93 includes a cylindrical portion 94 which extends outwardly to a stepped down cylindrical portion 96 that has a threaded outer end 98 for accommodating the diode clamp and light guide bushing 100.

The member 100 has a threaded end 102 which is screwed into the threaded end 98 of the mount 85.

Figure 6:
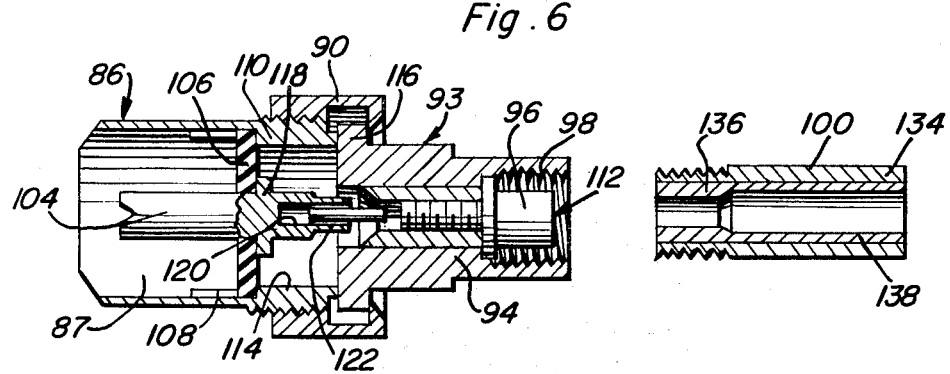
FIG. 6 is an assembly sectional view of the diode mount illustrated in FIG. 3.

The interior structure of the coaxial mount discussed is shown in FIG. 6. As will be observed, many of the interior components greatly resemble those of the previously discussed embodiments (FIG. 4 and 5).

The prongs 87 surround a sleeve-shaped conductor 104 identical with conductor 54 of FIG. 4. Identical components include the supporting insulating wafer 106 and the rib abutments 108.

Along the axis of sleeve 114 is a receptacle 118 and socket 120 identical to components 60 and 62 of the first embodiment (FIG. 4).

Figure 7:
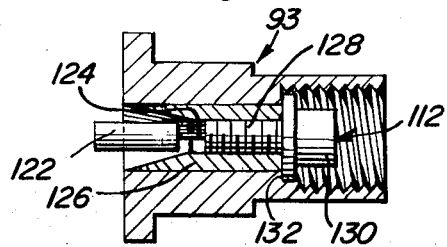
FIG. 7 is an enlarged sectional view of a subassembly included in the main portion of the diode mount of FIG. 6.

Referring to the subassembly as shown in FIG. 7, a probe 122, which is identical to the first embodiment probe 64, conducts current to the electro-optic device 112 as in the case of the first embodiment. A metallic sleeve 126 surrounds the threaded stud 128. The probe 122 is concentrically mounted in an insulating bushing 126 that is secured within the interior of the subassembly 93. The second current path to the electro-optic device 112 includes prongs 87, central section 90, the T-shaped conductor 116 (FIG. 6) and finally the high hat package of the electro-optic device 112.

FIG. 7 discloses the exact disposition of the electro-optic device 112. As will be noted from FIG. 7, the thin lead 124 serves as the first terminal of the device 112, while the stud 128 serves as the second terminal. An annular shoulder 132 is formed at the inner threaded end 98 of the subassembly so as to abut the high hat 130. Upon insertion of the diode clamp and light guide bushing 100, the electro-optic device is clamped against the abutment shoulder 132.

As seen in FIG. 6, the diode clamp and light guide bushing includes the straight cylindrical portion 134 terminating in a threaded portion 136 which is received within the threaded end portion 98 (FIG. 6). An appropriate lining material 138 forms an orifice-shaped axial bore through the diode clamp and light guide bushing 100. In operation of the second embodiment, a fiber optic is inserted within the axial space of liner 138.

The above discussion should make it manifestly clear that the present invention offers a novel and highly preferable coaxial diode mount using the basic design of conventional connectors. However, this basic use of conventional connectors strengthens the novel and useful aspects of the invention. Mainly, highly superior performance of light emitting diodes and detectors can be realized with high frequency applications by using the presently disclosed mounts.

It should be understood that the invention is not limited to the exact details of construction shown and described herein for obvious modifications will occur to persons skilled in the art.

Wherefor I claim:

1. A mount for an electro-optic device comprising:

A plug section having a first cylindrical conductor coaxially embracing an axial second conductor for connection to a separate terminal;

Connector means connected to the plug section conductor for transmitting current to an electro-optic device, said connector being a probe mounted in a bushing and extending therefrom for electrical connection to the second conductor plug section;

Insulation means mounted between said first and second conductors; said second conductor extending through the insulation means and forming a receptacle for receiving a mating connector from said electro-optic device;

Support means for positioning the electro-optic device co-axially within the mount; means attached to the mount at a point spaced from the plug section for holding a light guide means coaxially in proximity to the electro-optic device;

A cylindrical section for housing a subassembly connected to the plug section;

An axial section threadingly connected to the cylindrical section for mounting an insulator bushing;

whereby there is an energy conversion by the electro-optic device of electrical energy in the plug and light energy in the light guide.

2. The structure as recited in claim 1 wherein the electro-optic device includes a stud mounted in the bushing;

and further wherein a thin lead connects the probe and the stud thereby providing electrical communication between the second conductor of the plug section and the stud.

3. The structure as defined in claim 1 wherein the electro-optic device includes a housing portion connected to the cylindrical section of the mount thereby completing a conductive path to the first conductor of the plug section.

4. The structure of claim 1 wherein the electro-optic device is a light detecting diode.

5. The structure of claim 1 wherein the electro-optic device is a light detecting diode.

6. The structure of claim 1 wherein the light guide is characterized as a fiber optic.

7. The subject matter as recited in claim 3 wherein the housing and stud of the electro-optic device are disposed in coaxial relationship to each other.

8. The structure of claim 1 wherein the light guide holding means incorporates means for clamping one end of a light guide therein while the opposite end extends outwardly from the holding means for optical communication with a remote point.

* * * * *